April 22, 1969

E. J. BEVERS 3,439,496

TURBINE GOVERNOR

Filed Nov. 12, 1964

INVENTOR.
Eugene J. Bevers
BY
Paul Fitzpatrick
ATTORNEY

United States Patent Office
3,439,496
Patented Apr. 22, 1969

3,439,496
TURBINE GOVERNOR
Eugene J. Bevers, Indianapolis, Ind., assignor to General Motors Corporation, Detroit, Mich., a corporation of Delaware
Filed Nov. 12, 1964, Ser. No. 410,695
Int. Cl. F02c 9/04, 3/10
U.S. Cl. 60—39.16    2 Claims

ABSTRACT OF THE DISCLOSURE

A governor or fuel control for a free power turbine type of gas turbine engine. The gas generator governor flyweights are loaded by a first speeder spring, constantly operative, and a second speeder spring, which is opposed by a power turbine governor. A lost motion connection prevents the power turbine governor from overriding the first speeder spring, which thus maintains a minimum gas generator speed.

---

This invention relates to gas turbine engines and, more particularly, it relates to a governor for a dual rotor gas turbine which regulates the fuel flow to the combustion chamber and decreases the speed of the gas generator turbine to a predetermined minimum level upon overspeed of the power turbine.

Traditionally, a dual rotor gas turbine, which includes a gas generator turbine driving the compressor and a power turbine driving the external load, has separate governors for the gas generator turbine and for the power turbine. One method of controlling the speed of the power turbine is by automatically resetting the gas producer governor with a signal generated by the power turbine governor, thereby selecting a governed gas producer speed to match the load on the power turbine. Hence, when the power turbine reaches an overspeed condition for a given load, the power turbine governor senses this overspeed and activates the gas generator turbine governor to reduce the speed of the gas generator turbine, thereby reducing the amount of gas generated and automatically reducing the speed of the power turbine. This control system has had a serious shortcoming in that the gas producer speed can be reduced well below idle by the action of the power turbine governor during overspeeding of the power turbine.

The result of this situation is that when the gas producer speed has been reduced well below idle it takes a substantial amount of time to build back up when more output of the turbine is needed to overcome an increased load. It then becomes obvious that there is a need for a gas turbine engine governor which is capable of reducing the gas generator turbine speed during overspeed of the power turbine, but which reduces it to a predetermined level such that the gas generator turbine is capable of fast build up when the power turbine is required to deliver more output against an increased load.

It is, therefore, the object of the subject invention to provide a governor for a gas turbine engine which is capable of reducing the speed of the gas generator turbine to a predetermined level upon overspeeding of the power turbine, but which will not reduce the gas generator turbine to a speed so low as to make it ineffective when the power turbine needs increased speed.

Figure 1:
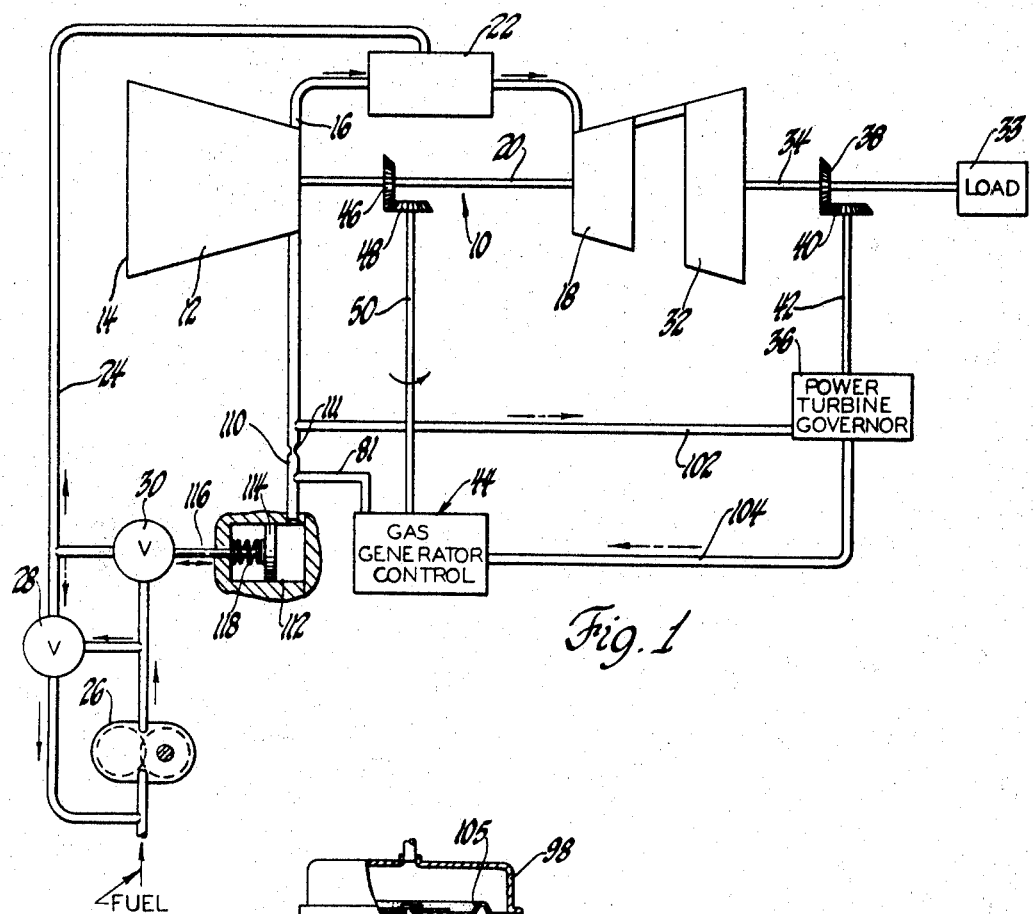
Figure 2:
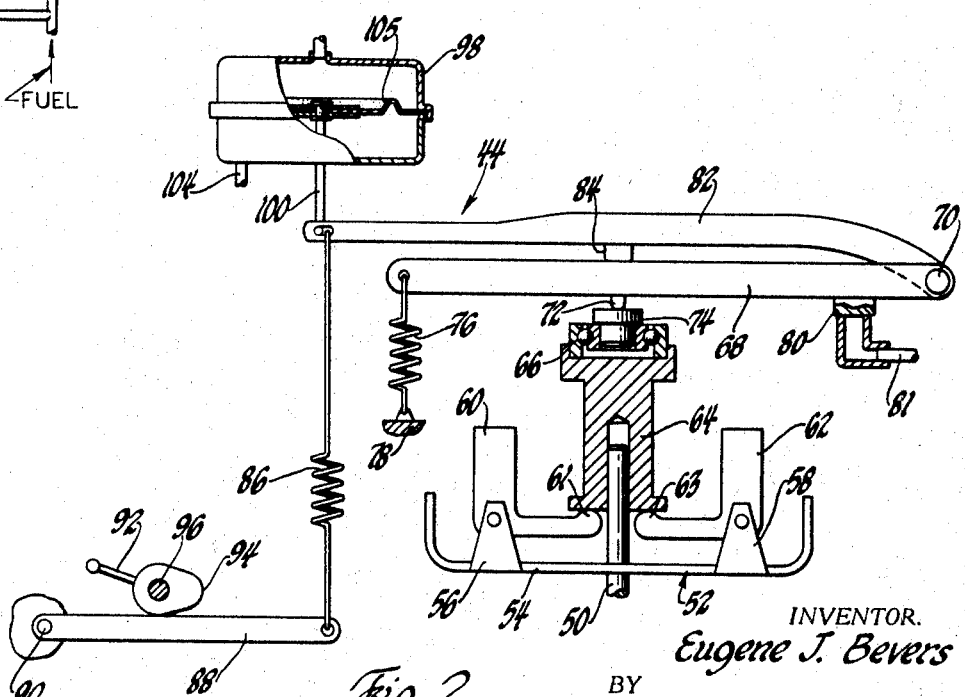

Other objects, features and advantages of the subject invention will become obvious upon reference to the succeeding detailed description and the drawings showing the preferred embodiment thereof, wherein:

FIGURE 1 is a schematic diagram of a gas turbine engine incorporating the subject invention; and FIGURE 2 is a schematic diagram of the component parts of the subject invention.

More particularly, FIGURE 1 schematically shows a conventional dual rotor gas turbine 10. A compressor 12 has an air inlet 14 and a compressor discharge outlet 16 and is driven by a gas generator turbine 18 through a shaft 20. A combustion chamber 22 receives the compressor discharge air and heats it with fuel which passes through fuel line 24. The fuel comes from a fuel source (not shown) and is forced through the fuel line 24 by a pump 26 and controlled by valves 28 and 30. The method of fuel control will be discussed later in connection with the subject governor. The combustion products of the compressed air and the fuel leave the combustion chamber 22 and expand through the gas generator turbine 18 and a power turbine 32. As mentioned previously, the gas generator turbine 18 is used to drive the compressor 12 my means of the shaft 20. The power turbine 32 is used to drive an external load 33. As seen in FIGURE 1, the speed of the output shaft 34 of the power turbine 32 is sensed by the power turbine governor 36 through gears 38 and 40 and shaft 42.

The speed of the gas generator turbine 18 is transmitted from the shaft 20 through gears 46 and 48 and shaft 50, which is seen to extend into the gas generator control 44. As shown in FIGURE 2, the shaft 50, driven by the gas generator turbine 18, has a flyweight device 52 attached to it. The flyweight device 52 includes a frame 54 and flanges 56 and 58 which are rotatable with the shaft 50. Movable weight portions 60 and 62 mounted on the flanges 56 and 58 and indicate the speed of rotation of the shaft 50 as they are moved in and out by the action of centrifugal force. As the speed of rotation of shaft 50 increases, the inner ends 61 and 63 of flyweights 60 and 62 move upwardly as the flyweights 60 and 62 pivot outwardly. A sleeve 64 slidably received on the end of the shaft 50 is moved thereon by the action of the flyweights. A thrust bearing 66 is positioned in the end of the sleeve 64 so that the linear movement of sleeve 64 can be transmitted to another member without the rotation also being transferred. A first arm 68 is pivoted about a fixed pivot point 70 and has a nub portion 72 which is in contact with the upper surface 74 of the thrust bearing 66. An idle spring 76 is attached to one end of the free end of the first arm 68 and is fixed at its other end to a stationary support 78. A fuel control means 80 also is actuated by the first arm 68. It is suggested that the fuel control means be a plate valve which, as the first arm 68 moves, releases some of the pressurized fluid which actuates the fuel control valve 30.

A second arm 82 located vertically above the first arm 68 and pivoted about the pivot point 70 has a nub portion 84 which rests on the upper surface of the first arm 68. Attached to the opposite end of the second arm 82 is a speeder spring 86 which is attached to a lever arm 88 pivoted about a fixed point 90. A manual power control lever 92 rotates a cam 94 about a pivot point 96 to control the position of the lever arm 88. The position of the second arm 82 then can be controlled by the manual control 92 through the lever arm 88 and the speeder spring 86. The position of the second arm 82 also can be affected by a power turbine speed sensor 98 which moves the second arm 82 by means of a connecting rod 100. The power turbine sensor may be any of several devices capable of receiving a signal from the power turbine governor 36 upon overspeed of the power turbine 32 and transmit this signal into a force on the second arm 82. It is suggested that this power turbine speed sensor 98 be an air or diaphragm motor capable of turning a gas pressure into mechanical movement. Hence, the power turbine governor 36 upon sensing overspeed of the power turbine 32 will transmit compressor discharge pressure, which has been received through conduits 102, to the power turbine speed sensor 98 by means of conduit 104 in FIGURE 1. As this pressurized gas, entering by means of conduit 104, builds up, the diaphragm 105 is more heavily biased and opposes the speeder spring 86 thereby lowering the speed setting, and thus allowing the flyweight mechanism to raise arms 68 and 82 to reduce fuel flow.

It should be noted that a conduit 110 containing an orifice 111 extends from the conduit 102 into a cylinder 112 thereby conducting compressor discharge pressure to this cylinder. A piston 114 is slidably mounted within the cylinder 112 and is fixed to a rod 116 which actuates the fuel control valve 30. A spring 118 is mounted within the cylinder 112 to resist the movement of the piston 114. A conduit 81 connects the conduit 110 to the plate valve 80 for purpose of decreasing the pressure of the compressor discharge gas in cylinder 112. Thus, it can be seen that as the pressure of the gas in cylinder 112 increases, the piston 114 will be forced to work against the spring to move the rod 116 and actuate the valve 30 thereby increasing the fuel flow to the combustion chamber 22.

The actual operation of the gas generator control will now be described in detail. First of all, it should be remembered that the plate valve 80 serves the purpose of reducing the pressure of the gas in the cylinder 112 thereby governing the fuel flow to the combustion chamber. It should be noted that, as the first arm 68 moves upward, the plate valve 80 opens and decreases the gas pressure as previously described. It can be seen that under normal operation the fuel flow can be controlled by setting the manual control lever 92 at the proper setting such that the positions of the arms 82 and 68 and the plate valve 80 are correct. As the gas generator turbine 18 reaches an overspeed condition, the flyweight device 52 is actuated so that centrifugal force pushes the movable portions 60 and 62 outwardly. The inner ends 61 and 63 of the movable flyweight portions 60 and 62 then are constrained to move upwardly producing a force on the collar 64 thereby moving the first arm 68 and opening the plate valve 80. Thus, the opening of the plate valve 80 decreases the pressure of the gas in the cylinder 112 thereby reducing the fuel flow to the combustion chamber. Hence, the subject gas generator control serves as an effective fuel governor upon overspeed of the gas generator turbine.

In addition, the subject gas generator control serves as a governor for the gas generator upon overspeed of the power turbine in a manner to be described. As the power turbine 32 overspeeds, the speed of rotation is sensed through the gears 38 and 40 and transmitted to the power turbine governor 36 through the shaft 42. Upon sensing this overspeed, the power turbine governor 36 allows compressor discharge gas to pass from conduit 102 through the conduit 104 thereby building up the pressure in the power turbine speed sensor 98. This compressor discharge pressure acts against the diaphragm 105 thereby biasing the speeder spring 86 and moving the connecting rod 100 and the second arm 82 upward. The result of this upward movement again is a further opening of the plate valve 80. Hence, it can be seen that the fuel flow can be governed by three means, the manual control lever 92, overspeed of the gas generator turbine 18 as sensed by the flyweight device 52, and overspeed of the power turbine 32 as sensed by the power turbine speed sensor 98. The result of all three of these governing actions is an opening of the plate valve 80 which decreases the pressure of the gas in cylinder 112 thereby actuating the fuel flow control valve 30 to decrease fuel flow to the combustion chamber.

Therefore, it can be appreciated that the value of the fuel flow can be reduced to such a small value that it is extremely hard for the gas generator turbine 18 to regain speed when the power turbine 32 needs more power to overcome increased load. Hence, the idle spring 76 has been installed to minimize the overall governing effect of the gas generator control. This idle spring 76 is calibrated to enforce a minimum speed level so as to keep the speed of the gas generator above this minimum level so that it is capable of returning to high speed operation in very short time. In other words, the fuel can be reduced, but as the gas generator turbine decreases to idle speed, spring 76 will close or partially close valve 80 to keep speed at idle setting.

Therefore, it should be appreciated that by proper selection of the idle spring 76 and proper calibration of the other components, namely the manual control lever 92, the speeder spring 86, and the power turbine sensor 98, a governor is produced which will reduce the speed of the gas generator turbine only to a predetermined minimum value thereby avoiding the disadvantages of previous such devices which continue to reduce the speed of the gas generator turbine to very low values.

Although but one embodiment of the subject invention has been described and shown in detail, it should be clear to those skilled in the art to which the invention pertains, that many changes and modifications may be made thereto without departing from the scope of the invention.

I claim:
1. A control system for a gas-coupled gas turbine engine having a gas generator turbine and a power turbine comprising, in combination,
   a gas generator governor responsive to gas generator turbine speed including a first speeder spring reacting against a fixed abutment effective to establish a desired minimum speed of the gas generator turbine,
   a second speeder spring having a positive unidirectional connection to the gas generator governor by-passing the first speeder spring, and
   a power turbine governor acting on the gas generator governor in opposition to the second speeder spring through the unidirectional connection,
   the unidirectional connection being such that the combination of second speeder spring and gas generator governor cannot oppose the first speeder spring and reduce the gas generator speed setting below the said minimum.
2. A control as recited in claim 1, includiny means for varying the setting of the second speeder spring.

References Cited
UNITED STATES PATENTS

| | | | |
|---|---|---|---|
| 3,152,444 | 10/1964 | Peczkowski et al. | 60—39.16 |
| 2,364,115 | 12/1944 | Whitehead | 137—34X |
| 2,856,754 | 10/1958 | Torell | 60—39.16X |
| 2,879,643 | 3/1959 | Stroh et al. | 137—34 |
| 3,022,629 | 2/1962 | Colley | 60—39.16X |
| 3,032,985 | 5/1962 | Alexander et al. | 60—39.16X |
| 3,040,529 | 6/1962 | Hurtle | 60—39.16X |
| 3,050,941 | 8/1962 | Rogers | 137—34X |

GEORGE F. MAUTZ, *Primary Examiner.*

U.S. Cl. X.R.

60—39.28.